United States Patent [19]

Gebhardt

[11] 3,932,164

[45] Jan. 13, 1976

[54] METHOD OF MANUFACTURING MINIATURE INCANDESCENT LAMPS

[75] Inventor: Karl Gebhardt, Stolberg-Busbach an Kurths-Muhle, Germany

[73] Assignee: U.S. Philips Corporation, New York, N.Y.

[22] Filed: Aug. 8, 1974

[21] Appl. No.: 495,916

[30] Foreign Application Priority Data

Aug. 14, 1973 Germany ............ 2341028

[52] U.S. Cl. ............ 65/32; 65/34; 65/36; 65/152

[51] Int. Cl.[2] ............ C03B 5/16; C03B 23/20

[58] Field of Search ............ 65/34, 43, 32, 36, 152

[56] References Cited

UNITED STATES PATENTS

| | | | |
|---|---|---|---|
| 1,398,033 | 11/1921 | Maurer | 65/34 X |
| 1,448,351 | 3/1923 | Kirlin | 65/34 |
| 2,006,568 | 7/1935 | Gustin et al. | 65/34 X |
| 2,945,327 | 7/1960 | Malm et al. | 65/43 X |
| 3,409,342 | 11/1968 | Anderson et al. | 65/32 X |
| 3,505,050 | 4/1970 | Huston, Jr. | 65/34 |
| 3,688,812 | 9/1972 | Fredericks | 65/34 |
| 3,798,491 | 3/1974 | Malm | 65/34 X |

FOREIGN PATENTS OR APPLICATIONS

| | | | |
|---|---|---|---|
| 507,999 | 12/1954 | Canada | 65/34 |
| 261,398 | 11/1925 | United Kingdom | 65/34 |

*Primary Examiner*—Robert L. Lindsay, Jr.
*Assistant Examiner*—Frank W. Miga
*Attorney, Agent, or Firm*—Frank R. Trifari

[57] ABSTRACT

In the manufacture of miniature incandescent lamps having a pinched glass cap, an inert cooling gas is blown through the exhaust tube during the pinching operation so as to keep the exhaust tube open.

5 Claims, 3 Drawing Figures

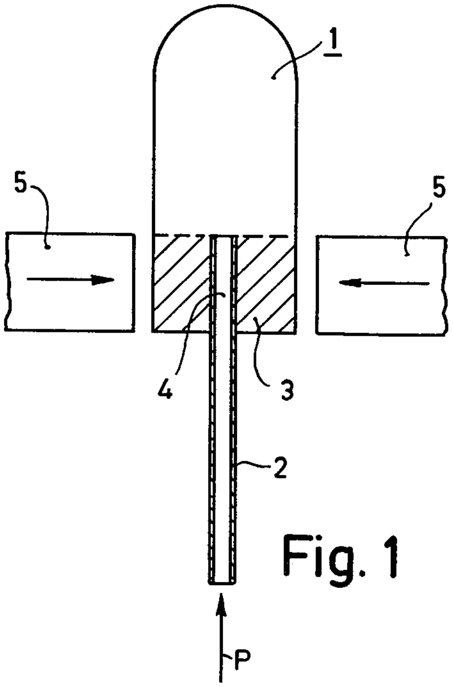
Fig. 1
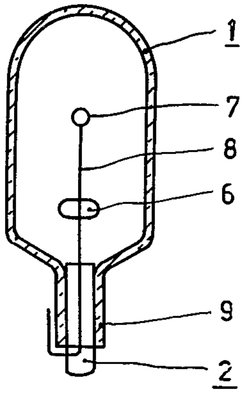
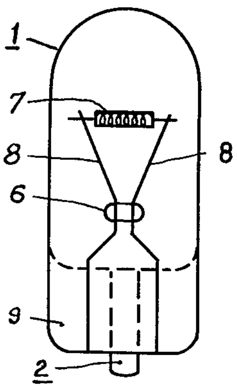
Fig. 2
Fig. 3

METHOD OF MANUFACTURING MINIATURE INCANDESCENT LAMPS

The invention relates to a method of manufacturing miniature incandescent lamps having a pinched glass cap in which during the pinching operation a sealing of the exhaust tube, whose inside diameter is smaller than 1 mm, with the lamp envelope occurs simultaneously.

Such miniature incandescent lamps have a diameter of the envelope smaller than 12 mm. The connection wires first project beyond the pinched glass cap downwards and are then bent back along the glass cap. The dimensions of the glass cap are in accordance with DIN or IEC prescriptions. The glass caps have essentially a rectangular cross-section.

For pinching the glass cap and for the simultaneous seal of the exhaust tube with the envelope of the lamp, the exhaust tube and the envelope should first be heated to the softening temperature of the glass types. During the subsequent pinching of the glass cap the danger exists that the inner cross-section of the exhaust tube is considerably squeezed and even closed by the pressure. The cross-section required for the subsequent evacuation of the lamp envelope is then no longer available. The inside diameter of the exhaust tube actually is smaller than 1 mm (outside diameter is smaller than 2 mm) and thus is in a range in which the pumping quality is substantially independent of the suction capacity of the pump and is determined only by the conductivity resistance of the exhaust tube. Any increase in the cross-section of the exhaust tube thus automatically results in a deterioration of the pumping quality.

It has already been tried in known methods of the above type to avoid the described drawbacks by choosing for the exhaust tube a type of glass having a higher melting point than the type of glass of the envelope. For example, the envelope has been chosen to consist of lead glass and the exhaust tube of lime glass. However, the resulting effect was not sufficient to avoid a deformation of the exhaust tube during the quenching operation.

It is the object of the invention to provide a method of manufacturing miniature incandescent lamps having a pinched glass cap in which during the pinching operation no deformation or squeezing of the exhaust tube can occur.

In a method of the type mentioned in the preamble this is achieved according to the invention in that, in order to keep the exhaust tube open, an inert cooling gas is blown through the exhaust tube during the pinching operation at such a temperature and flow rate that the temperature of the inner wall of the exhaust tube remains below the transformation temperature of the glass while the outer wall of the exhaust tube assumes a temperature which ensures a tight seal of exhaust tube and envelope.

Due to the blowing-in of an inert cooling gas during the pinching operation it is achieved that the inner wall of the exhaust tube remains so cold that a deformation of the exhaust tube cannot occur without, however, cooling the outer wall of the exhaust tube so strongly that no perfect seal is obtained any longer between the exhaust tube and the lamp envelope.

The temperature of the cooling gas is preferably chosen to be slightly below room temperature, preferably at approximately 18°C.

According to an advantageous embodiment of the method according to the invention, the scavenging gas and/or filling gas of the lamp is used as a cooling gas. It is to be noted that it is known from the German Auslegeschrift No. 1,279,180 in the case of halogen lamps to blow an inert or reducing gas, for example nitrogen, through the exhaust tube during the manufacture of a pinch. However, the only object of said blown-in inert gas is to protect the metal parts in the lamp from oxidation. In this case the pinching tools are recessed or notched in the centre so that the inside of the wall of the envelope and the outside of the wall of the exhaust tube are sealed in an air-tight manner without the passage through the interior of the exhaust tube being closed. In halogen lamps, however, the envelope of the lamp and the exhaust tube consist of quartz glass having a comparatively high melting point. The dimensions of the pinch can freely be chosen since the pinch is not used as a glass cap. Normally, in halogen lamps the inside diameter of the exhaust tube is approximately 2.5 mm and its outside diameter is approximately 4.5 mm; this means that the wall thickness of the exhaust tube is 1 mm and hence comparatively large. For this reason, cooling of the inner wall of the exhaust tube in halogen lamps is not necessary during pinching, since the temperature which occurs at the inner wall as a result of the large wall thickness of the exhaust tube is not sufficient for any deformation in normal cases. Moreover, the shape of the pinching tool may be adapted by suitable recesses in such manner that, also when the deformation temperature should be reached, there exists no danger of pinching of the exhaust tube. If, contrary to expectations, a slight reduction in cross-section of the exhaust tube should nevertheless occur, this will have no influence on the pumping quality as a result of the comparatively large inside diameter of the exhaust tube.

Quite different is the case, however, in the miniature incandescent lamps according to the present application, in which both the envelope and the exhaust tube consist of normal glass (lead glass or lime glass) and the exhaust tube has a wall thickness of approximately 0.5 mm which is so small that during the pinching operation the danger of a deformation of the exhaust tube exists, the more so since the prescribed dimensions of the pinched glass cap exclude a design of the pinching tool which avoids certainly the squeezing of the exhaust tube.

The invention will now be described in greater detail with reference to an embodiment shown in the drawing.

FIG. 1 shows diagrammatically a pinching operation according to the invention in which the individual lamp and device components are shown on a strongly exaggerated scale.

FIGS. 2 and 3 show the finished miniature incandescent lamp in two side elevations.

Reference numeral 1 denotes a lamp envelope of a miniature incandescent lamp, for example, of lead glass. 2 denotes an exhaust tube of, for example, lime glass. The envelope 1 has, for example, an outside diameter of approximately 10 mm and the exhaust tube 2 has an inside diameter of 0.85 mm and a wall thickness of 0.55 mm. Both parts are held in a device which is not shown. The lower, shaded part 3 of the envelope is heated by a burner not shown. The upper part 4 of the exhaust tube 2 present in the envelope 1 is heated simultaneously by heat transmission. After the deformation temperature has been reached, the shaded part 3 of the envelope is pinched around the end 4 of the exhaust tube by means of two pinching tools 5 the operative surfaces of which correspond to the sides of a standardized glass cap. During the pinching operation an inert cooling gas is blown from the lower side through the exhaust tube 2 (arrow P) at such a temperature and flow rate that the temperature of the inner wall of the exhaust tube remains below the transformation temperature of the glass, while the outer wall of the exhaust tube assumes a temperature which ensures a tight seal of the exhaust tube 2 and the lamp envelope 1. The cooling gas is preferably the scavenging and/or filling gas itself. After the pinching operation the lamp is pumped to the prescribed pressure, filled with a filling gas, if desired, and the exhaust tube 2 is sealed immediately below the pinching zone 9.

A lamp manufactured in this manner is shown in two side elevations in FIGS. 2 and 3. Accommodated in the lamp is a bead set which consists of an insulating bead 6, a filament 7 and two current supplies 8. The current supplies 8 project from below from the pinching zone 9 and are bent outwardly along the pinch. The bead set is not shown in FIG. 1 for clarity.

What is claimed is:

1. A method of manufacturing miniature incandescent lamps having an envelope having a glass pinch and an exhaust tube extending within the cap having an inside diameter smaller than 1 mm, which comprises heating the envelope and then mechanically pinching the envelope to form a pinch and simultaneously form the seal between the exhaust tube and the heated glass cap, and blowing an inert cooling gas through the exhaust tube during the pinching operation to keep it open, the temperature and flow rate of the cooling gas being selected to keep the inner wall of the exhaust tube below the transformation temperature of the glass, while the outer wall of the exhaust tube assumes a temperature which ensures a tight seal of the exhaust tube and the envelope.

2. A method as claimed in claim 1, wherein the temperature of the cooling gas is chosen to be slightly below room temperature, preferably at approximately 18°C.

3. A method as claimed in claim 1 wherein the cooling gas is simultaneously used for a second purpose other than cooling.

4. A method as claimed in claim 3 wherein said second purpose is scavanging.

5. A method as claimed in claim 3 wherein said second purpose is filling the envelope.

* * * * *